United States Patent [19]

Küchemann

[11] Patent Number: 4,779,929
[45] Date of Patent: Oct. 25, 1988

[54] VARIABLE-HEIGHT AND VARIABLE-SLANT HEAD REST WITH A CENTER WINDOW FOR MOTOR VEHICLES

[75] Inventor: Friedel Küchemann, Dassel Markoldendorf, Fed. Rep. of Germany

[73] Assignee: FHS Stahlverformung GmbH, Iserlohn, Fed. Rep. of Germany

[21] Appl. No.: 78,786

[22] Filed: Jul. 28, 1987

[30] Foreign Application Priority Data

Jul. 30, 1986 [DE] Fed. Rep. of Germany ....... 3625691

[51] Int. Cl.$^4$ .............................................. A47C 7/36
[52] U.S. Cl. .................................. 297/408; 297/410; 297/391
[58] Field of Search ............... 297/408, 409, 410, 404, 297/405, 391

[56] References Cited

U.S. PATENT DOCUMENTS

| 3,186,763 | 6/1965 | Ferrara ............................... 297/408 |
| 3,507,539 | 4/1970 | Putsch et al. ........................ 297/410 |

FOREIGN PATENT DOCUMENTS

| 2037033 | 3/1972 | Fed. Rep. of Germany ...... 297/408 |
| 7623536 | 11/1976 | Fed. Rep. of Germany . |
| 7722401 | 1/1977 | Fed. Rep. of Germany . |
| 7637061 | 3/1978 | Fed. Rep. of Germany . |
| 3104628 | 8/1982 | Fed. Rep. of Germany ...... 297/391 |
| 3200321 | 7/1983 | Fed. Rep. of Germany . |
| 3323229 | 1/1985 | Fed. Rep. of Germany ...... 297/391 |
| 3021122 | 9/1985 | Fed. Rep. of Germany . |
| 2630281 | 1/1987 | Fed. Rep. of Germany . |
| 2467730 | 5/1981 | France ................................ 297/391 |
| 2537064 | 6/1984 | France ................................ 297/410 |
| 2537415 | 6/1984 | France ................................ 297/410 |
| 2544264 | 10/1984 | France . |
| 2040675 | 9/1980 | United Kingdom ................ 297/391 |

Primary Examiner—Kenneth J. Dorner
Assistant Examiner—Laurie K. Cranmer
Attorney, Agent, or Firm—Bacon & Thomas

[57] ABSTRACT

A variable-height and variable-slant head rest with a center window, for motor vehicles comprising two mounting rods adapted to be attached by their one ends to the back rest of a motor vehicle seat and a support frame embedded in a cushion body and adapted to be shifted along the mounting rods and to be pivoted in relation to the mounting rods and having hollow side struts receiving the other ends of the mounting rods. The support frame is pivotally supported on two circular disks running on the one ends of the mounting rods. The disks are each arranged in a cylindrical socket of corresponding diameter formed by a widened portion of a slot-like cavity on both side struts of the support frame. Each cavity has a width substantially equal to the diameter of its respective mounting rod and abutment surfaces for the mounting rod which diverge in a direction away from the socket. The disks each have a diametral hole through which the respective mounting rod extends.

16 Claims, 4 Drawing Sheets

VARIABLE-HEIGHT AND VARIABLE-SLANT HEAD REST WITH A CENTER WINDOW FOR MOTOR VEHICLES

BACKGROUND OF THE INVENTION

1. Field of the Invention

The invention relates to a motor vehicle head rest having a center window and adapted to be adjusted by the user to extend at the desired height and with the desired slant relative to the back rest of the motor vehicle seat provided with the head rest.

2. Description of the Prior Art

Various head rests with a center window for motor vehicles are known which include a support frame embedded in a cushion body and two mounting rods adapted to be attached at one pair of corresponding ends to the back rest of a motor vehicle seat, said support frame having two hollow side struts receiving the other corresponding ends of the mounting rods and being adapted to be shifted along the mounting rods and/or to be pivoted with respect thereto.

With one such head rest, the two hollow side struts of the support frame are each in the form of a tube in order to run on its respective mounting rod end, and the cushion body is provided with two elastic clamping members for the one and respectively the other mounting rod, especially with two rubber sleeves, which each clamp on the respective mounting rod adjacent to the opening therefor in the respective side strut of the support frame. This head rest can be adjusted in height, but not with respect to its slant angle. An example of this type of head rest is disclosed by German utility model No. 7,623,536.

Another type of head rest is known wherein the two hollow side struts of the support frame each have a side chamber at the end adjacent to the respective mounting rod, and the two mounting rod ends received in the side struts are each provided with an end section bent at a right angle and clamped in a slotted plastic bushing arranged in the chamber of the side strut associated with the mounting rod end and screwed to the support frame. The two side strut chambers are placed opposite to each other between the center opening of the support frame and its end adjacent to the mounting rods, as well as the two mounting rod end sections, about which the support frame may be pivoted in relation to the mounting rods until inner abutment surfaces of its side struts engage the mounting rods on the one or the other side of the same. This head rest may only be adjusted as to its angle of slant and cannot be adjusted in height. An example of this type of head rest is disclosed by German utility model No. 7,722,401.

Lastly, still another type of head rest is known wherein the two hollow side struts of the support frame have two sliding plastic sleeves disposed therein which extend for at least half the height of the support frame, run on the ends of the two mounting rods extending in the side struts and are adapted to be pivoted in the side struts about a common pivot axis extending adjacent and parallel to a lower longitudinal strut of the support frame parallel thereto. At the ends adjacent to this longitudinal strut and from which the sliding sleeves extend towards an upper longitudinal strut of the support frame or in the opposite direction to the mounting rod openings of the side struts thereof, the sliding sleeves are each provided with a perpendicular lateral stud or projection. The two mutually opposite studs defining the common pivot axis, each are clamped in a slotted plastic bushing arranged in a chamber formed in the adjacent end of the lower longitudinal strut of the support frame and screwed to the latter. The two projections extend on the same side beside the plane defined by the corresponding mounting rod ends and are passed by a common bearing pin which also passes through the two side struts of the support frame and defines the pivot axis. The sliding sleeves are each locked by detent means onto the mounting rod end sliding therein, and for this purpose they are each provided with a resilient catch element cooperating with catch notches of the associated mounting rod end. The side struts of the support frame each have internal abutment surfaces for the respective sliding sleeve which diverge away from the said pivot axis. These head rests are adapted to be adjusted in height and inclination and are disclosed by German Pat. No. 3,021,122 and German patent application No. 3,200,321.

SUMMARY OF THE INVENTION

One object of the invention is to provide an improved head rest having an extremely compact, sturdy and simple structure, economical to manufacture, while at the same time being easily adjustable, and being highly convenient to use.

This and other objects are realized by the features recited by claim 1. Advantageous remaining improvements of the head rest in accordance with the invention are defined in the further claims.

Two embodiments of the head rest in accordance with the invention shall be described with reference to the accompanying drawings.

DETAILED DESCRIPTION OF THE PREFERRED EMBODIMENTS

Figure 1:
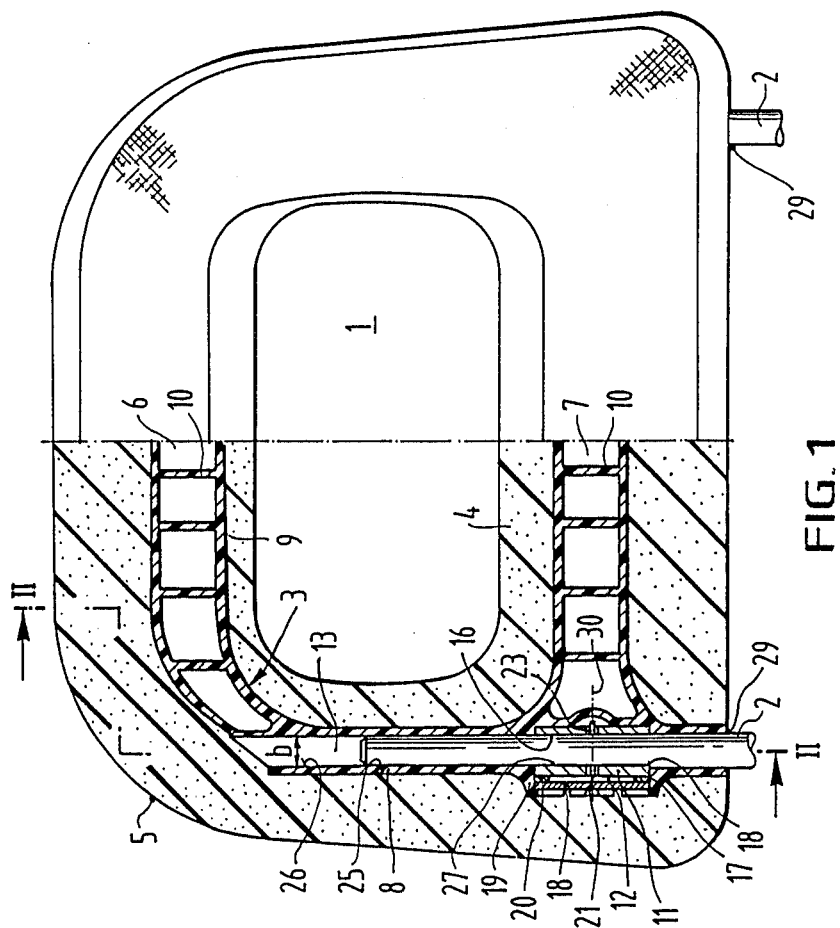
FIG. 1 is a front elevational view, partly in section taken on the line I—I in FIG. 2, of a first embodiment of the invention.

A head rest for motor vehicles, as shown in FIGS. 1 through 4, is adapted to be adjusted both in height and in inclination. The rest has a center window 1, a pair of metal mounting rods 2, a plastic support frame 3 and a cushion body 4 of expanded plastic, the latter being enclosed in an outer sheath 5 of textile material and is foam-molded onto the support frame 3.

The relatively stiff support frame 3 embedded in the relatively soft cushion body 4 has an upper longitudinal strut 6, a lower longitudinal strut 7 and two side struts 8, all of which surround and define a center opening 9. The two longitudinal struts 6 and 7 are hollow and provided with internal stiffening walls 10. The two side struts 8 are also hollow in order to receive the upper ends of the mounting rods 2, the lower ends of which are to be attached to the back rest of the motor vehicle seat which is to be fitted with the head rest.

The support frame 3 can be slid and also tilted in relation to the mounting rods 2. For this purpose it is pivotally mounted on two circular disks 11 which slidably support mounting rods 2. Each disk 11 is fitted in a cylindrical socket 12 of corresponding diameter formed by a widened portion of the internal cavity 13 of the one or the other side strut 8, respectively, of the support frame 3. Each cavity 13 is formed as a slot and has a width b, in the longitudinal direction of the support frame 3, which is essentially equal to the diameter of the upper end of the mounting rod 2 disposed therein. The cavities 13 of the two side struts 8 extend transversely with respect to the median plane, defined by the line I—I in FIG. 2, of the support frame 3, and are each provided with a pair of upper abutment surfaces 14 and a pair of lower abutment surfaces 15 for the upper end of the asssociated mounting rod 2, such surfaces 14 and 15 diverging away from the socket 12 of each respective cavity 13. Each disk 11 has a diametral hole 16 through which the upper end of the respective mounting rod 2 extends.

The cylindrical sockets 12 of the two side struts 8 of the support frame 3 are each open on the outer side in order for the respective disk 11 to be fitted therein. The circular opening 17 of each side strut 8 is closed by a circular cover 18, which is locked within the side strut 8 by detent means, in the form of radially resilient catch elements 19 of the side strut 8 arranged around its opening 17 and engaging over the periphery of the cover 18 placed therein. Between each cover 18 and its adjacent disk 11 is compressed an annular friction element 20 in order to provide a certain amount of friction between the two disks 11 and the support frame 3. This friction has to be overcome on pivoting the support frame 3 on the disks 11 and acts to maintain the support frame in the pivoted position relative to the two mounting rods 2. This ensures that a desired pivoted setting is not inadvertently changed.

The two disks 11 are locked by detent means on the mounting rods 2 and for this purpose they are each provided with a resilient catch element 21, which cooperates with a row of catch notches 22 on the upper end of the respective rod 2. Element 21 is formed by a generally U-shaped steel spring member, which is disposed in a transverse slot 23 of the disk 11 so that one straight leg of element 21 snaps into the catch notches 22 of the respective mounting rod end and that an outwardly arcuate portion carried by the other leg of element 21 fits around the other side of the end of mounting rod 2, this being clearly shown in FIG. 3.

Figure 2:
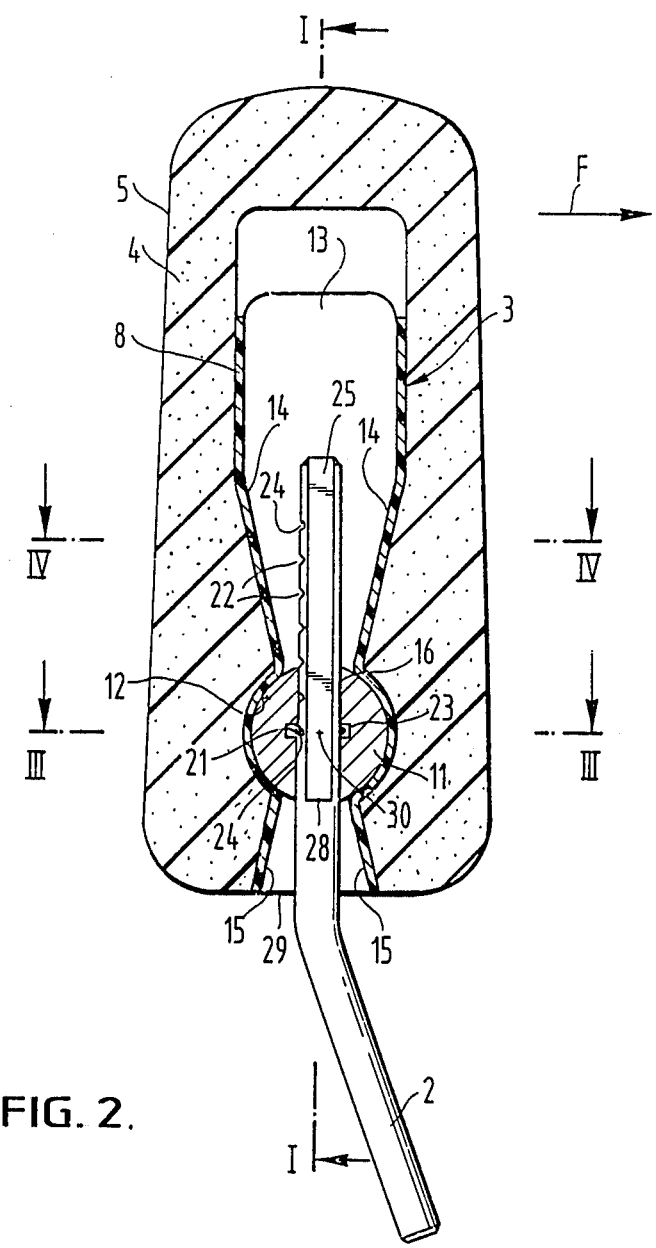
FIG. 2 shows an enlarged section taken on the line II—II of FIG. 1.

Just as the support frame 3 may in fact only be tilted to a limited extent as defined by the internal abutment surfaces 14 and 15 of its two side struts 8, it may only be displaced axially to a limited extent in relation to the mounting rods 2 as well. Such axial displacement is between the position as indicated in FIGS. 1 and 2 and a position in which the end surfaces of the upper ends of the two mounting rods 2 are generally flush with the upper ends of the through holes 16 of the two disks 11. In this latter position, the catch elements 21 thereof engage into the uppermost catch notches 22 of the mounting rods 2. Accordingly, it is not possible to pull the support frame 3 clear of the mounting rods 2 or for the latter to come so far out of its two side struts 8 as to prod the cushion body 4. Thus, the two side struts 8 may be provided with slot-shaped cavities 13 that are left open at the top. The sliding of the support frame 3 along the mounting rods 2 is limited by disposing the upper side surface of the uppermost catch notch 22 and the lower side surface 2 to each extend in a plane perpendicular to the longitudinal axis of its upper end in order to form an abutment surface 24 for the straight leg of the catch element 21 of the associated disk 11. This arrangement prevents the displacement of the disk 11 of its respective mounting rod end beyond catch element abutment surfaces 24, either upwards or downwards.

Figure 3:
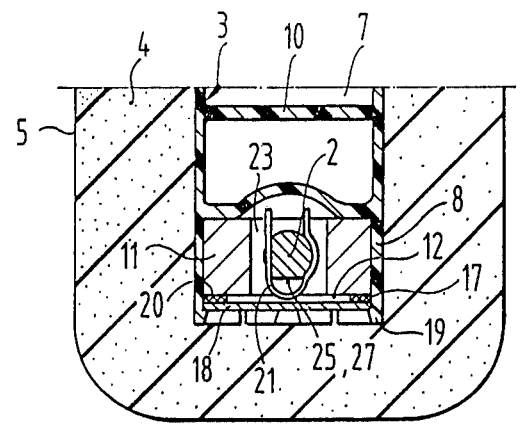
FIG. 3 is a section taken on the line III—III of FIG. 2.
Figure 4:
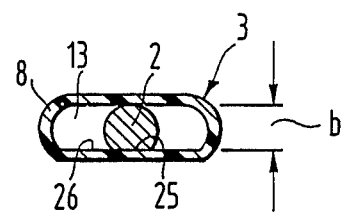
FIG. 4 is a section taken on the line IV—IV of FIG. 2, the cushion body having been omitted.

In order to facilitate the attachment of the head rest with the mounting rods 2 on the back rest of an associated motor vehicle seat, there is provided a rotation preventing means for each of the two mounting rods 2 so that they cannot turn out of the angular positions about their own axes in relation to the support frame 3. This is realized by providing each mounting rod 2 with a lateral flat surface 25, which engages the adjacent flat side surface 26 of the cavity 13 of the associated side strut 8 of the support frame 3, which is clearly shown in FIGS. 1 and 4. With reference to FIGS. 1, 3 and 4, it is also shown that each cavity 13 is narrower above and below its cylindrical socket 12 than the latter. The socket width must match the thickness of the respective disk 11 which thickness has to be larger than the diameter of the upper end of the associated mounting rod 2 and of the through hole 16 of the disk 11. As indicated in FIG. 1 each through hole 16 may also be provided with a flat surface 27 extending in the longitudinal direction, which engages the flat surface 25 of the upper end of the associated mounting rod 2. A shoulder 28 at the lower end of each flat surface 25 cooperates with its associated disk 11 to form an additional abutment for limiting the sliding motion of the mounting rod 2 in the cavity 13 of the respective side strut 8 in an upward direction, a shown in FIGS. 1 and 2.

The two circular disks 11 are arranged adjacent to the lower longitudinal strut 7 of the support frame 3 extending near the lower openings 29 of its two side struts 8. The lower ends of mounting rods 2 protrude through openings 29 and are bent to the right, as shown in FIG. 2. The two disks 11 may each be made of metal or plastic. For the latter material, it is important to note that the coefficient of friction between the disks 11 and the sockets 12 of the side struts 8 of the support frame 3 shall remain most constant for all conditions of operation to be expected. For this purpose it is possible, when the disks 11 are made of plastic, to provide each disk on its periphery with an outer metal ring or an outer metal coating and/or each socket 12 on each of the two opposite, shell-shaped walls with an inner metal ring segment or an inner metal coating.

For the vertical height adjustment of the head rest as shown in FIGS. 1 through 4, all that is required is for the user to grip the cushion body 4 and to pull it in an upward direction or to push it in a downward direction along the mounting rods 2 until the desired distance from the upper edge of the back rest has been reached and the two catch elements 21 of the disks 11 running along the upper ends of the mounting rods 2 snap into the two corresponding catch notches 22 of the mounting rod ends. To adjust the inclination of the rest, all that is necessary is for the user to grip the cushion body 4 and to pull it forwards or to push it backwards in order to pivot the embedded support frame 3 to the required degree clockwise or counter-clockwise, as shown in FIG. 2, about the two disks 11 which are disposed concentrically with respect to a transverse pivot axis 30 extending between the two upper ends of the mounting rods 2. Upon an impact against the side of the rest shown in FIG. 2 in a direction opposite to the direction F of travel, the cushion body 4 and the embedded support frame 3 will swing about the pivot axis 30 out of the adjusted pivoted position until the lower left abutment surface 15 and possibly the upper right abutment surface 14 of the inner cavity 13 of each side strut 8 of the support frame 3 come into engagement with corresponding portions of the associated mounting rod 2.

Figure 5:
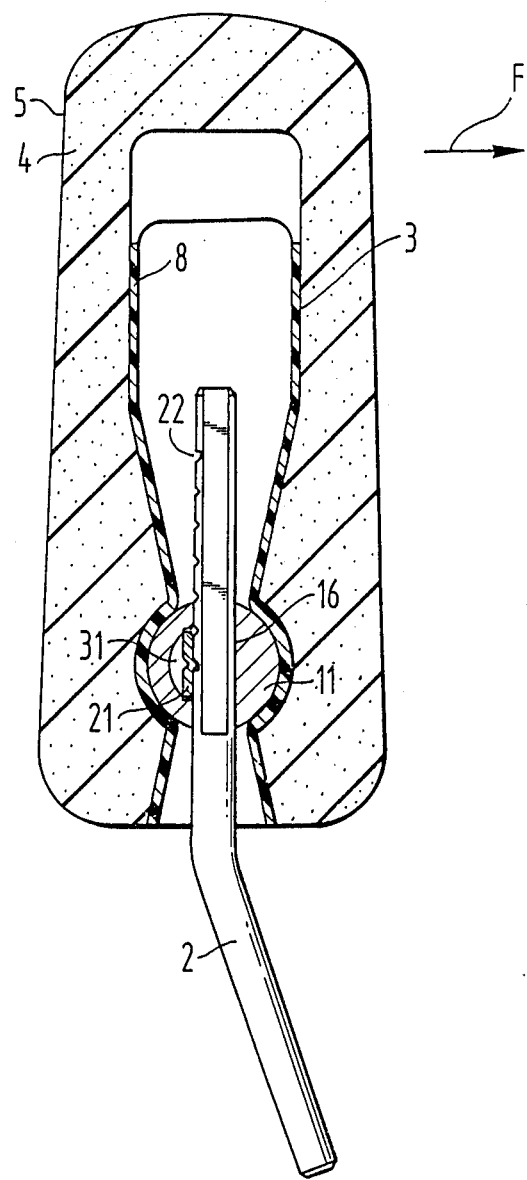
FIG. 5 is a sectional view, corresponding to that of FIG. 2, of a second embodiment of the invention.

The embodiment of FIG. 5 differs from that shown in FIGS. 1 through 4 only inasfar as the two catch elements 21 of the circular disks 11 are different in configuration and arrangement. They each consist of a special leaf spring 21 with a center point for engaging into the catch notches 22 of the respective mounting rod 2. Each spring 21 is fitted into a transverse recess 31 of its respective disk 11, with recess 31 opening into the through hole 16 thereof.

Modifications of the embodiments described and illustrated herein are possible. For example, it is not absolutely necessary for the two friction elements 20 to be of annular configuration and, instead, they may consist of solid disks without any opening. It is also possible for the two disks 11 to be clamped without the use of friction elements 20 in the sockets 12 of the two side struts 8 of the support frame 3 in such a manner that there is a certain amount of friction between the disks 11 and the support frame 3. For instance, the two shell-shaped walls of each side strut 8 defining the cylindrical socket 12 of its inner cavity 13 around the pivot axis 30 and surrounding the associated circular disk 11 on opposite sides can be clamped together by means of a screw connection so as to press them against the periphery of the disk 11 and to so clamp the latter that the desired amount of friction results between it and the two shell-shaped walls.

Since the disks 11 may be made very thin and their thickness necessary for the respective through hole 16 only has to be slightly larger than the diameter of the upper ends of the mounting rods 2, especially if the mounting rod ends are each provided with the flat 25, it is possible to arrange the two disks 11 at any position in the two side struts 8 of the support frame 3. That is, in positions different from that adjacent to the lower longitudinal strut 7 thereof, as is the case in the embodiments previously described and illustrated. They may certainly be arranged on both sides of the center opening 9 of the support frame 3 and of the center window 1 of the head rest, if this should be desired for any reason. Since the upper ends of the mounting rods 2 are enclosed in the hollow side struts 8 of the support frame 3 on both sides of the disks 11 directly, not only the longitudinal struts 6 and 7 of the support frame 3, but also the side struts 8 thereof, can be made very slender so that the cushion body 4 may be made with a large bulk to improve comfort even if the head rest has to be very compact with small dimensions. The mechanism allowing the support frame 3 to be pivoted on the mounting rods 2 is of great advantage inasfar as the two pivot bearings for the support frame 3 formed with the circular disks 11 are precisely in alignment with the two mounting rods 2, which leads to a very sturdy structure and results in a trouble-free adjustability of the head rest that requires only a few simple components and may be economically manufactured with very simple tooling and with very little labor.

I claim:

1. A variable-height and variable-slant head rest for motor vehicles, the head rest being of the type including a center window, a pair of mounting rods for attachment at one pair of corresponding ends to the back rest of a vehicle seat, a cushion body, a support frame embedded within the cushion body and having a pair of hollow side struts which receive the other pair of corresponding ends of the rods, whereby the cushion body may be shifted along and pivoted in relation to the rods, the rest comprising:
   (a) each of the hollow side struts including a slot-shaped cavity having a cylindrical socket defined by a widened portion of the cavity;
   (b) a circular disk disposed within the cylindrical socket;
   (c) two pairs of abutment surfaces formed by walls of the cavity diverging away from opposite sides of the socket;
   (d) each circular disk including a diametral hole through which a corresponding mounting rod extends to permit the disk to slide along the rod; and
   (e) whereby the support frame is supported primarily on the circumferential surfaces of the disks for pivotal movement with respect thereto and sliding movement along the rods.
2. The head rest of claim 1 wherein each side strut includes an opening on a side of and adjacent to the socket to permit insertion of the corresponding disk into the socket, and a cover for closing the opening.
3. The head rest of claim 2 further including detent means for locking the covers onto the side struts.
4. The head rest of claim 1 further including means for clamping the disks within their respective sockets so as to impart a controlled degree of friction between the disks and the support frame.
5. The head rest of claim 4 wherein the means for clamping the disks in their respective sockets includes a frictional element disposed between each disk and its adjacent cover.
6. The head rest of claim 1 further including detent means for locking each mounting rod to its corresponding disk.
7. The head rest of claim 6 wherein the detent means includes a plurality of spaced notches carried by the mounting rod and a resilient catch element selectively engageable within the notches.
8. The head rest of claim 7 wherein the two terminal notches of each mounting rod each includes an abutment surface which extends in a plane perpendicular to the longitudinal axis of the mounting rod and forms a stop for the catch element, said stops preventing displacement of the disk beyond the terminal notches.
9. The head rest of claim 1 wherein the hollow side struts terminate in a pair of openings disposed adjacent to a longitudinal strut of the support frame, with the mounting rods extending through said openings and the sockets of the side struts being disposed at the ends of the longitudinal strut.
10. The head rest of claim 1 wherein each mounting rod is provided with a flat surface, each side strut is provided with a corresponding flat surface, and the flat surfaces of the rod and side strut are engageable for preventing rotation of the rod with respect to the strut.
11. The head rest of claim 1 wherein the support frame is made of plastic material and the two disks are each made of metal.
12. The head rest of claim 1 wherein the support frame is made of plastic material and the two disks are each made of plastic material, with each disk further including an outer ring made of metal.

13. The head rest of claim 1 wherein the support frame is made of plastic material and the two disks are each made of plastic material, with each disk further including an outer metal coating.

14. The head rest of claim 1 wherein the support frame is made of plastic material and the sockets of the two side struts are each provided with inner metal ring segments.

15. The head rest of claim 1 wherein the support frame is made of plastic material and the sockets of the two side struts are each provided with an inner metal coating.

16. The head rest of claim 1 wherein each mounting rod is provided with a flat surface, the diametral hole of each disk is provided with a corresponding flat surface and the flat surfaces of the rod and the hole are engageable for preventing rotation of the rod with respect to the disk.

* * * * *

UNITED STATES PATENT AND TRADEMARK OFFICE
CERTIFICATE OF CORRECTION

PATENT NO. : 4,779,929
DATED : October 25, 1988
INVENTOR(S) : Friedel Küchemann

It is certified that error appears in the above—identified patent and that said Letters Patent is hereby corrected as shown below:

Column 1, line 62:   delete "parallel thereto";

Column 3, line 43:   after "respective", insert: -- mounting --;

Column 4, line 2:    after "surface", insert: -- of the lowermost catch notch 22 of each mounting rod --;

Column 4, line 6:    after "disk 11" delete "of" and insert therefor: -- on --.

Signed and Sealed this

Fourth Day of April, 1989

Attest:

DONALD J. QUIGG

Attesting Officer

Commissioner of Patents and Trademarks